UNITED STATES PATENT OFFICE.

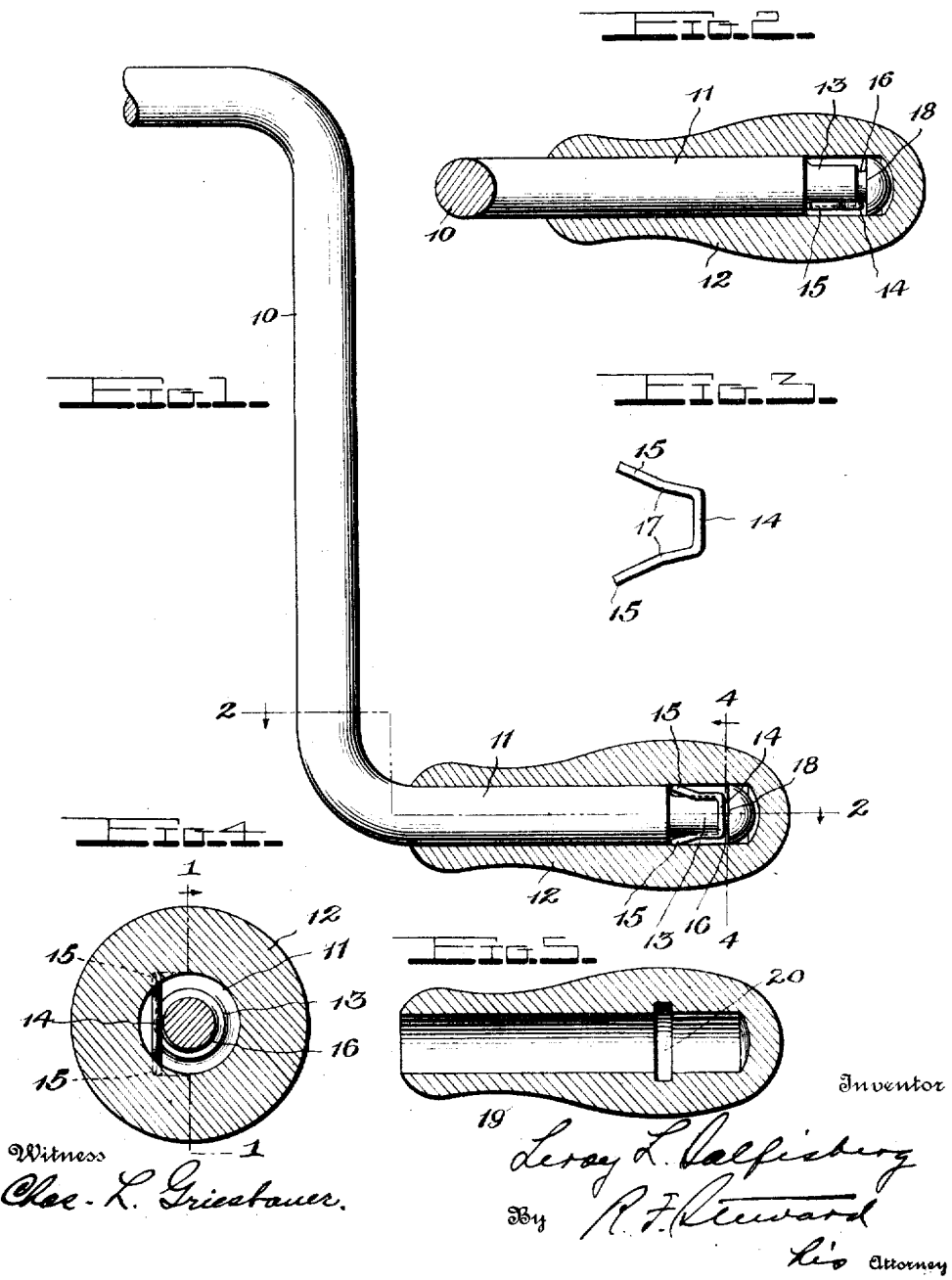

LEROY L. SALFISBERG, OF PLANO, ILLINOIS, ASSIGNOR TO GRAY PIANO COMPANY, OF PLANO, ILLINOIS, A CORPORATION OF ILLINOIS.

HANDLE DEVICE.

1,208,839.   Specification of Letters Patent.   Patented Dec. 19, 1916.

Application filed July 17, 1916. Serial No. 109,742.

*To all whom it may concern:*

Be it known that I, LEROY L. SALFISBERG, citizen of the United States, residing at Plano, in the county of Kendall and State of Illinois, have invented certain new and useful Improvements in Handle Devices; and I do hereby declare the following to be a full, clear, and exact description of the invention, such as will enable others skilled in the art to which it appertains to make and use the same.

This invention relates to handle devices for cranks and the like and more particularly to a crank handle comprising a grip member secured to a crank spindle or pin by coupling means wholly inclosed and concealed between the grip member and the spindle, said coupling member being of such character and so disposed as to permit the grip to turn freely on the spindle, but to positively lock it against being pulled off the spindle.

In various types of hand cranks, such as those used with automobile engines, talking machines, etc., it is desirable to have a grip member adapted to be seized by the hand and revoluble with respect to the crank pin upon which it is mounted, so that when the crank is turned the handle grip will be free to turn with respect to its spindle and will not rub against the hand. Ordinarily a grip member of this description is secured in place by a nut, screw or rivet at the end of the crank pin, or by some other external fastening means; but such an arrangement is disadvantageous for the reason, among others, that it involves either a rough projecting fastening part, or else a countersink in the grip to avoid this. Attempts have also been made to couple a handle grip to its spindle by means located wholly within the grip; but the constructions heretofore proposed have been too complicated to find practical application and they also fail to positively lock the grip against removal.

The object of the present invention is to provide a simple and inexpensive handle construction which is not open to the above objections, and in which the grip can be readily assembled with its spindle and is freely revoluble thereon, while at the same time it is positively held against removal therefrom by fastening means entirely covered by the grip.

The invention is especially adapted for handles with wooden grips, but it is not limited thereto.

One practical form which the invention may take is shown in the accompanying drawings, which illustrate a hand crank embodying the principles involved.

In these drawings: Figure 1 is a side elevation of the crank partly in section on the line 1—1 of Fig. 4; Fig. 2 is a plan partly in section on the line 2—2 of Fig. 1; Fig. 3 shows the coupling member in elevation on a larger scale and in expanded uncompressed condition; Fig. 4 is a transverse section on the line 4—4 of Fig. 1, but on a larger scale and Fig. 5 is a longitudinal section of a modified form of handle grip.

The metal crank 10 has a portion 11 constituting a spindle or pin which forms a handle part and upon which is revolubly secured the hollow handle grip 12, assumed in this instance to be of wood. At 13 the spindle is reduced in diameter for a distance sufficient to accommodate between the grip and spindle the resilient coupling member, which in the present example consists of a piece of stout spring wire, shaped more or less in the form of a U, with a transverse base portion or cross-piece 14, and arms 15. The reduced portion of the spindle is grooved at 16 to receive the base 14 of the coupling member, said base desirably being of such width that, as shown in Fig. 4, it is kept in the groove by the inner wall of the grip member. Moreover, by bending the arms 15 slightly as at 17, those portions adjacent the base 14 are made to lie closely adjacent and parallel to the reduced part of the spindle; while beyond the bends, the arms diverge and press strongly against the inner surface of the grip, the wire coupling being here shown as lying in a single plane to one side of the spindle axis. Shoulder 18 on the spindle provides a limiting abutment for the coupling member. The coupling member, though unattached either to the grip or the spindle, therefore has a locking engagement with both to prevent the grip being pulled off the spindle. This specific arrangement offers important advantages in the way of compactness and simplicity, but the construction is obviously capable of considerable variation within the scope of the invention.

Is assembling the parts of the device here shown, the wire coupling member is placed in the reduced portion 13 of the crank spindle with its base or cross-piece 14 lying in the groove 16. The hollow wooden grip member is then pushed on over the spindle into the position shown in Figs. 1 and 2, compressing and forcing toward each other the arms of the spring wire coupling. The outward pressure of the arms against the grip is such that if it be attempted to pull the grip off the spindle, the cross-piece 14 of the coupling member is forced against shoulder 18, causing the free ends of the coupling arms to bite deeper into the wood of the grip, whereby the parts are positively locked together against relative longitudinal movement, although they are free to turn with respect to each other, the coupling member turning with the grip. The ends of the spring arms may be pointed to facilitate partial entry into the wood, but this is not essential with wire of sufficient stiffness. The inner surface of the grip may optionally be shouldered or grooved to receive and lock the ends of the spring arms, and this, or some equivalent provision, is necessary where the grip is of metal instead of wood.

Fig. 5 shows such a grip 19 made of metal, and provided internally with the locking groove 20 adapted to receive the ends of the spring coupling.

It is evident that, in a handle device constructed in accordance with the invention, the coupling member is wholly inclosed by the grip member and is inaccessible after the parts are assembled.

What I claim is:

1. In a handle device, the combination of a spindle having a reduced portion, a handle grip on said spindle, and a resilient coupling member disposed in said reduced portion and covered by said grip, said coupling member being unattached either to the grip or to the spindle but arranged to limit longitudinal movement of the grip on the spindle in at least one direction while permitting the grip to turn on the spindle.

2. In a handle device, the combination of a spindle having a reduced portion, a handle grip on said spindle, a spring coupling member located in the reduced portion between the spindle and the grip and having a locking engagement with both though unattached to either, whereby relative longitudinal movement of the grip and spindle in one direction is substantially prevented while relative rotational movement is permitted.

3. In a handle device, the combination of a spindle having an abutment shoulder, a handle grip on said spindle and an approximately U-shaped spring wire coupling member between the spindle and the grip, but unattached to either, said coupling member bearing with its base against said shoulder and with its free ends against said grip, and locking the grip and spindle together against relative longitudinal movement while permitting their relative rotation.

4. In a handle device, the combination of a spindle having a reduced portion and a groove adjacent one end of said reduced portion, a handle grip on said spindle, a resilient coupling member inclosed between the grip and spindle but unattached to either, and having a transverse portion engaging said groove, and having arms extending toward the other end of said reduced portion and in locking engagement with said grip.

5. In a handle device, a spindle, a hand grip thereon, and coupling means wholly inclosed between said spindle and grip but unattached to either, said coupling means being arranged to positively lock the grip against longitudinal movement in one direction relative to the spindle, while permitting it to turn freely on the spindle.

6. In a handle device, the combination of a spindle having an abutment shoulder, a hand grip on said spindle, and a resilient coupling member arranged between the handle grip and the spindle but unattached to either, said coupling member being arranged to press against said grip and to revolve therewith, and to have sliding engagement with said abutment shoulder.

7. In a handle device, the combination of a spindle having abutment means, a hand grip mounted on said spindle and provided interiorly with abutment means, and a coupling member arranged between said grip and spindle but unattached to either and adapted to coöperate with both abutment means to resist removal of the grip from the spindle, while permitting the grip to turn on the spindle.

8. In a handle device, the combination of a spindle having an abutment shoulder, a handle grip mounted on said spindle and provided interiorly with a groove, and a spring coupling arranged between the grip and spindle but unattached to either and engaging both said groove and said abutment shoulder, whereby removal of the grip from the spindle is resisted, while relative turning movement of the grip and spindle is permitted.

In testimony whereof I hereunto affix my signature.

LEROY L. SALFISBERG

It is hereby certified that the assignee in Letters Patent No. 1,208,839, granted December 19, 1916, upon the application of Leroy L. Salfisberg, of Plano, Illinois, for an improvement in "Handle Devices," was erroneously written and printed as "Gray Piano Company," whereas said name should have been written and printed as *Gray Plano Company*, as shown by the records of assignments in this office; in the printed specification, page 1, line 109, for the word " Is " read *In;* and that the said Letters Patent should be read with these corrections therein that the same may conform to the record of the case in the Patent Office.

Signed and sealed this 16th day of January, A. D., 1917.

[SEAL.]

F. W. H. CLAY,
*Acting Commissioner of Patents.*

Cl. 74—33.